(12) United States Patent
Han et al.

(10) Patent No.: US 12,434,310 B2
(45) Date of Patent: Oct. 7, 2025

(54) AUXILIARY SUPPORT DEVICE FOR ROLLING-CUT SHEAR

(71) Applicant: Taiyuan University of Science and Technology, Taiyuan (CN)

(72) Inventors: Heyong Han, Taiyuan (CN); Wenshuo Wang, Taiyuan (CN); Hao Teng, Taiyuan (CN); Li Wu, Taiyuan (CN); Yue Hou, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 139 days.

(21) Appl. No.: 18/585,023

(22) Filed: Feb. 22, 2024

(65) Prior Publication Data
US 2025/0073791 A1    Mar. 6, 2025

(30) Foreign Application Priority Data
Aug. 28, 2023   (CN) .......................... 202311087076.8

(51) Int. Cl.
*B23D 15/06* (2006.01)
*B23D 15/14* (2006.01)
(Continued)

(52) U.S. Cl.
CPC ............. *B23D 15/06* (2013.01); *B23D 15/14* (2013.01); *B23D 33/02* (2013.01); *B23D 35/005* (2013.01); *B23D 36/0008* (2013.01)

(58) Field of Classification Search
CPC ...... B23D 15/106; B23D 15/14; B23D 33/02; B23D 35/005; B23D 36/008;
(Continued)

(56) References Cited

U.S. PATENT DOCUMENTS 3,600,995 A * 8/1971 Hanni .................. B23D 33/025
83/17
3,841,183 A * 10/1974 Van Zyl ............... B23D 33/025
83/636
(Continued)

FOREIGN PATENT DOCUMENTS

CN        107876862 A  *  4/2018  ............ B23D 33/00
CN        112620763 A  *  4/2021  ............ B23D 15/06

*Primary Examiner* — Ghassem Alie
(74) *Attorney, Agent, or Firm* — MATTHIAS SCHOLL P.C.; Matthias Scholl (57) ABSTRACT

An auxiliary support device for a rolling-cut shear, including: a lower cutting table; a plurality of first hydraulic support cylinders, a plurality of support plates, a plurality of second hydraulic support cylinders shorter than the first hydraulic support cylinders, a slide plate, and a plurality of horizontal hydraulic cylinders. The lower cutting table includes a first front end including a first mounting groove, and a second mounting groove, and an inner plate. The bottom wall of the second mounting groove includes a plurality of first bolt holes and a plurality of first recesses. The inner plate is embedded in the second mounting groove through a plurality of bolts passing through the plurality of first bolt holes. The inner plate includes a plurality of second bolt holes and a plurality of second recesses. The plurality of support plates lean against the inner plate.

6 Claims, 10 Drawing Sheets

(51) Int. Cl.
  *B23D 33/02* (2006.01)
  *B23D 35/00* (2006.01)
  *B23D 36/00* (2006.01)
(58) Field of Classification Search
  CPC ...... B23D 33/025; B23D 35/00; B29D 30/46; Y10T 83/9483; Y10T 83/8866; Y10T 83/8691; Y10T 83/8845
  USPC ......... 83/694, 641, 630, 639, 699, 698, 635, 83/524
  See application file for complete search history.

(56) References Cited

U.S. PATENT DOCUMENTS

| | | | | |
|---|---|---|---|---|
| 4,246,816 | A | * | 1/1981 | Ivanoff ................ B23D 33/025 83/636 |
| 12,365,108 | B2 | * | 7/2025 | Häupel ................ B26D 7/0675 |

* cited by examiner

AUXILIARY SUPPORT DEVICE FOR ROLLING-CUT SHEAR

CROSS-REFERENCE TO RELATED APPLICATIONS

Pursuant to 35 U.S.C.§ 119 and the Paris Convention Treaty, this application claims foreign priority to Chinese Patent Application No. 202311087076.8 filed Aug. 28, 2023, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of rolling-cut equipment, and more particularly to an auxiliary support device for a rolling-cut shear.

Rolling-cut shear is an important tool for cutting, sizing, and trimming of wide and thick plates. At present, when a rolling-cut shear processes the head of a plate, the head is often in a hanging state. Due to the existence of the torque, the plate is subjected to a combined effect of shearing, stretching and bending at the same time, resulting in collapse of the shear section of the plate. While during processing of the tail of the plate, the head of the plate is supported by the oscillating rollers, which belong to a stress state of simply supported beams. The shear process is considered as a "pure shearing", and the section quality of the tail is good.

Thus, to improve the quality of the shearing section of the sheet metal and achieve "pure shearing" during the shearing process, it is necessary to develop an auxiliary support device for rolling-cut shears.

SUMMARY

To solve the aforesaid problems, the disclosure provides an auxiliary support device for a rolling-cut shear, comprising: a lower cutting table; a plurality of first hydraulic support cylinders, a plurality of support plates, a plurality of second hydraulic support cylinders shorter than the plurality of first hydraulic support cylinders, a slide plate, a plurality of horizontal hydraulic cylinders.

The lower cutting table comprises a first front end comprising a first mounting groove for receiving a lower shear blade of the rolling-cut shear, and a second mounting groove, and an inner plate; a bottom wall of the second mounting groove comprises a plurality of first bolt holes and a plurality of first recesses; the inner plate is embedded in the second mounting groove through a plurality of bolts passing through the plurality of first bolt holes; the inner plate comprises a plurality of second bolt holes and a plurality of second recesses; and the plurality of support plates lean against the inner plate; the plurality of first hydraulic support cylinders and the plurality of horizontal hydraulic cylinders are disposed in the plurality of first recesses; each of the plurality of first hydraulic support cylinders comprises a first support rod; the slide plate comprises a first transverse plate, a second transverse plate, a third transverse plate, and a fourth transverse plate; a top end of the first support rod abuts against a bottom end of the fourth transverse plate; a second front end of each of the plurality of first hydraulic support cylinders is connected to a first rear end of each of the plurality of second hydraulic support cylinders through a connection rod; each of the plurality of second hydraulic support cylinders comprises a second support rod; and bottom ends of the first transverse plate, the second transverse plate, and the third transverse plate abut against top ends of second support rods, respectively; each of the plurality of horizontal hydraulic cylinders comprises a third support rod, and a second rear end of each of the plurality of first hydraulic support cylinders is connected to a third front end of the third support rod.

In a class of this embodiment, the plurality of first hydraulic support cylinders synchronously control corresponding first support rods to extend and retract; the plurality of second hydraulic support cylinders synchronously control corresponding second support rods to extend and retract; the first support rods and the second support rods synchronously extend and retract with a speed; the plurality of horizontal hydraulic cylinders synchronously control corresponding third support rods to extend and retract; all hydraulic support cylinders are a hydraulic servosystem, and each of the hydraulic support cylinders is equipped with a built-in magnetostrictive displacement sensor to provide real-time feedback on a position of a corresponding support rod.

In a class of this embodiment, a first bottom surface of each of the plurality of first hydraulic support cylinders and each of the plurality of second hydraulic support cylinders comprises a sliding groove configured to fit with a slide rail fixed on ground of a workshop; a top surface of the slide rail is flush with a second bottom surface of the lower cutting table; and a leading end of the slide rail is oriented to the same direction as a leading end of the lower cutting table.

In a class of this embodiment, the inner plate is attached to the bottom wall of the second mounting groove, and a longitudinal width of the inner plate is less than a longitudinal width of the second mounting groove; a width difference between the inner plate and the second mounting groove is equal to a thickness of the fourth transverse plate plus a mounting margin; the fourth transverse plate is parallel to the lower cutting table and is disposed in a gap between the inner plate and the second mounting groove; and a depth of the second mounting groove is equal to a width of the fourth transverse plate.

In a class of this embodiment, the bottom ends of the plurality of support plates are flush with a bottom end of the inner plate, and each of the bottom ends of the plurality of support plates comprises a right-angle groove for fitting and approaching the plurality of support plates to the second mounting groove of the lower cutting table; top ends of the plurality of support plates are flush with a top end of the inner plate, and the plurality of support plates abut at intervals against an outer wall of the inner plate.

In a class of this embodiment, the second rear ends of the plurality of first hydraulic support cylinders are embedded in the plurality of second recesses and the plurality of first recesses; the plurality of second recesses and the plurality of first recesses are in line with slide rails; two sides of the plurality of horizontal hydraulic cylinders are disposed in the plurality of first recesses; a third bottom surface of each of the plurality of horizontal hydraulic cylinders is flush with second bottom surface of the lower cutting table; and a third rear end of each of the plurality of horizontal hydraulic cylinders is disposed in the plurality of first recesses.

In a class of this embodiment, a steel plate is disposed on the lower cutting table; the steel plate is sheared by a combination of the lower shear blade and an upper shear blade disposed in an upper knife box.

The disclosure also provides a working process of the auxiliary support device for a rolling-cut shear.

When the slide plate is retracted in the second mounting groove:

Y1: moving a steel plate to the upper plane of the lower cutting table and setting a cutting size; driving an upper knife box comprising an upper shear blade to move to perform rolling cutting downwards; as the upper knife box falls, the upper shear blade contacts and presses the steel plate; the upper shear blade and the lower shear blade cooperate to cut the steel plate, achieving the function of plate cutting;

Y2: the slide plate is embedded in the second mounting groove, and the waste material produced after cutting falls onto the inclined surface of the slide plate due to gravity, freely sliding to a waste collection point to achieve the waste transportation function of the slide plate; at this point, a workflow ends.

When the slide plate moves out of the second mounting groove:

S1: moving a steel plate to the upper plane of the lower cutting table and setting a cutting size; synchronously controlling, by the plurality of horizontal hydraulic cylinders, the corresponding third support rods to extend to the optimal support positions, that is, the fourth transverse plate of the slide plate moves fully out of the lower cutting table and a gap between the fourth transverse plate and the lower shear blade corresponds to a thickness of the steel plate; synchronously driving the plurality of first hydraulic support cylinders and the plurality of second hydraulic support cylinders along slide rails to move towards the front end of the lower cutting table, thus achieving the reciprocating movement of the hydraulic support cylinders; in this way, the first support rods synchronously extend out of the plurality of first hydraulic support cylinders in the same speed as that of the second support rods synchronously extending out of the plurality of second hydraulic support cylinders; the slide plate is lifted vertically, so that the top end face of the fourth transverse plate is at the same height as the upper end face of the lower cutting table and in contact with the bottom of the steel plate, to support the steel plate;

S2: driving an upper knife box comprising an upper shear blade to move to perform rolling cutting downwards; as the upper knife box falls, the upper shear blade contacts and presses the steel plate; the plurality of first hydraulic support cylinders provide upward hydraulic support force, allowing the first support rods to support the bottom end of the fourth transverse plate, thereby supporting the bottom of the steel plate; the upward hydraulic support force is less than the downward shear force, and is offset by the part of the downward shear force of the upper knife box, achieving approximate "pure shear"; when falling, the upper knife box will naturally press the first support rods and the second support rods into their respective hydraulic support cylinders; each of the hydraulic cylinders is equipped with a built-in magnetostrictive displacement sensor, which can provide real-time feedback on the position of the support rods; the upper shear blade and the lower shear blade work together to cut the head of the steel plate, achieving the function of plate shearing;

S3: the head of the steel plate that has been cut off is waste material; the waste material is subjected to downward pressure from the upper shear blade and upward support force from the fourth transverse plate of the slide plate, causing the waste material to be sandwiched between the upper shear blade and the fourth transverse plate; as the upper shear blade falls to its limit position, the upper knife box lifts upwards, the waste material stays on the top end face of the fourth transverse plate; at this point, the first support rods retract into the plurality of first hydraulic support cylinders at a first speed, and the second support rods retract into the plurality of second hydraulic support cylinders at a second speed which is the same as the first speed; the slide plate vertically descends and is clamped into the gap between inner plate and the second mounting groove;

S4: the third support rods synchronously retract into the plurality of horizontal hydraulic cylinders, driving the plurality of first hydraulic support cylinders and the plurality of second hydraulic support cylinders to move towards the rear end of the lower cutting table along the slide rails; the slide plate gradually moves towards the second mounting groove, and the waste material staying on the top of the fourth horizontal plate moves towards the rear end of the lower cutting table along with the slide plate, and touches the front end of the lower cutting table; the waste material is squeezed down from the top of the fourth horizontal plate and falls freely onto the inclined surface of the slide plate under gravity, achieving the waste transportation; with the third support rods synchronously retracting into the hydraulic cylinder, the fourth horizontal plate is driven to fully embed into the second mounting groove of the inner plate, and the inclined surface of the slide plate adheres to the inclined surfaces of the support plates; the bottom of the fourth horizontal plate is attached to the top of the support plates, thus achieving a cycle of workflow.

The following advantages are associated with the auxiliary support device for a rolling-cut shear of the disclosure: the device of the disclosure optimizes the stress state of the steel plate to be sheared, provides upward support force for the steel plate during the shearing process, avoids the generation of adverse force arms, reduces the comprehensive impact of shearing, tension, and bending forces on the steel plate, improves the quality of the fracture surface of the metal sheets, and enhances the production efficiency and competitiveness of metal sheet products.

In the drawings, the following reference numbers are used: 1. Upper knife box; 101. Upper shear blade; 2. Steel plate; 3. Lower cutting table; 301. Lower shear blade; 302. First bolt hole; 303. First recess; 304. First mounting groove; 305. Second mounting groove; 4. First hydraulic support cylinder; 401. First support rod; 5. connection rod; 6. Slide rail; 7. Support plate; 8. Second hydraulic support cylinder; 801. Second support rod; 9. Slide plate; 901. First transverse plate; 902. Second transverse plate; 903. Third transverse plate; 904. Fourth transverse plate; 10. Inner plate; 1001. second recess; 11. Bolt; 12. Horizontal hydraulic cylinder; 1201. Third support rod; 13. Waste material.

DETAILED DESCRIPTION

To further illustrate the disclosure, embodiments detailing an auxiliary support device for a rolling-cut shear are described below. It should be noted that the following embodiments are intended to describe and not to limit the disclosure.

Unless otherwise specified, the terms "mount", "dispose", "connect", etc. or variants thereof should be broadly understood. "Connection", for example, can be a fixed connection, a detachable connection, or an integrated connection; it can be a mechanical connection or an electrical connection; it can be directly connected, or indirectly connected through an intermediate medium, or it can be an internal connection between two components. For ordinary skill in the art, they can understand the specific meanings of the above terms in the disclosure based on specific circumstances.

Figure 1:
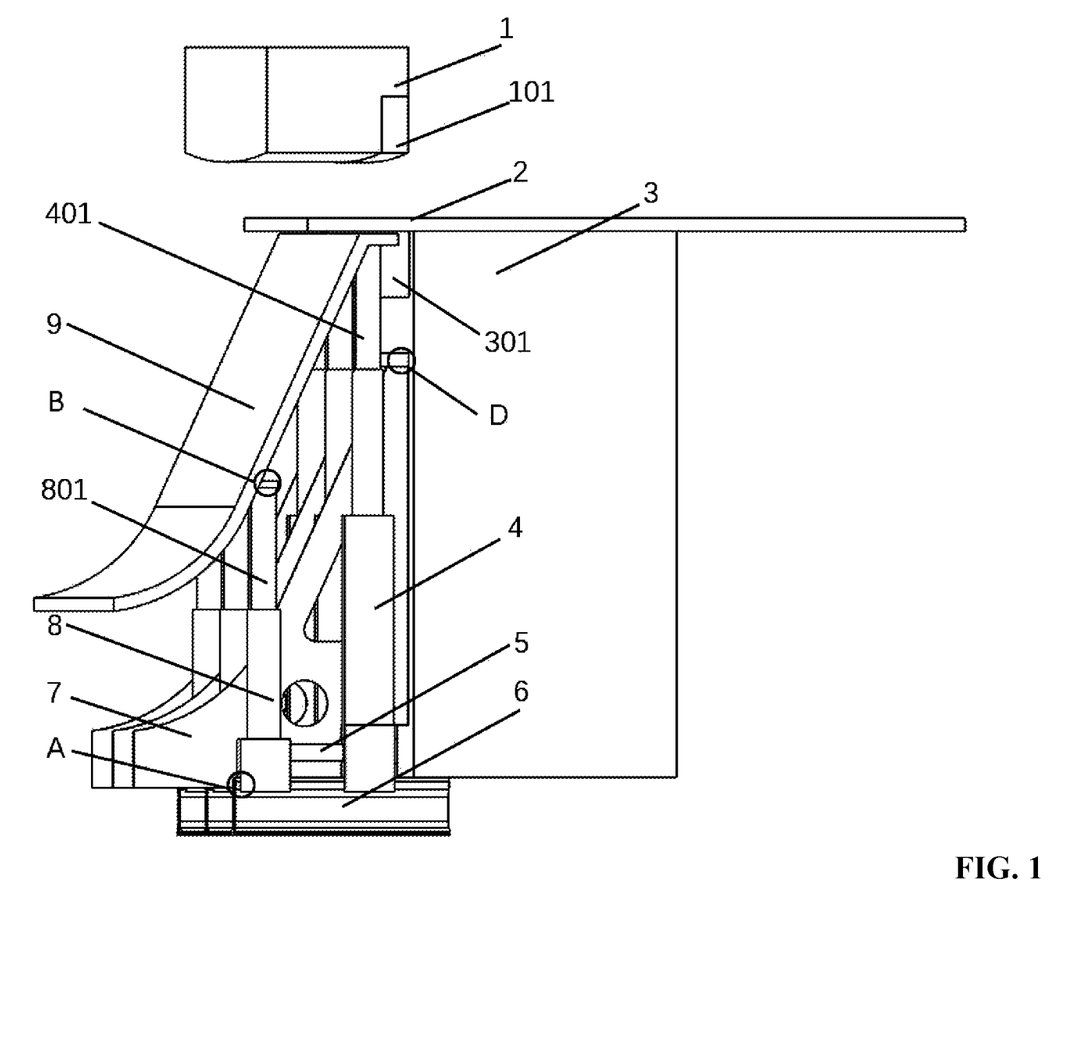
FIG. 1 is a schematic diagram of an auxiliary support device for a rolling-cut shear according to one embodiment of the disclosure.
Figure 3:
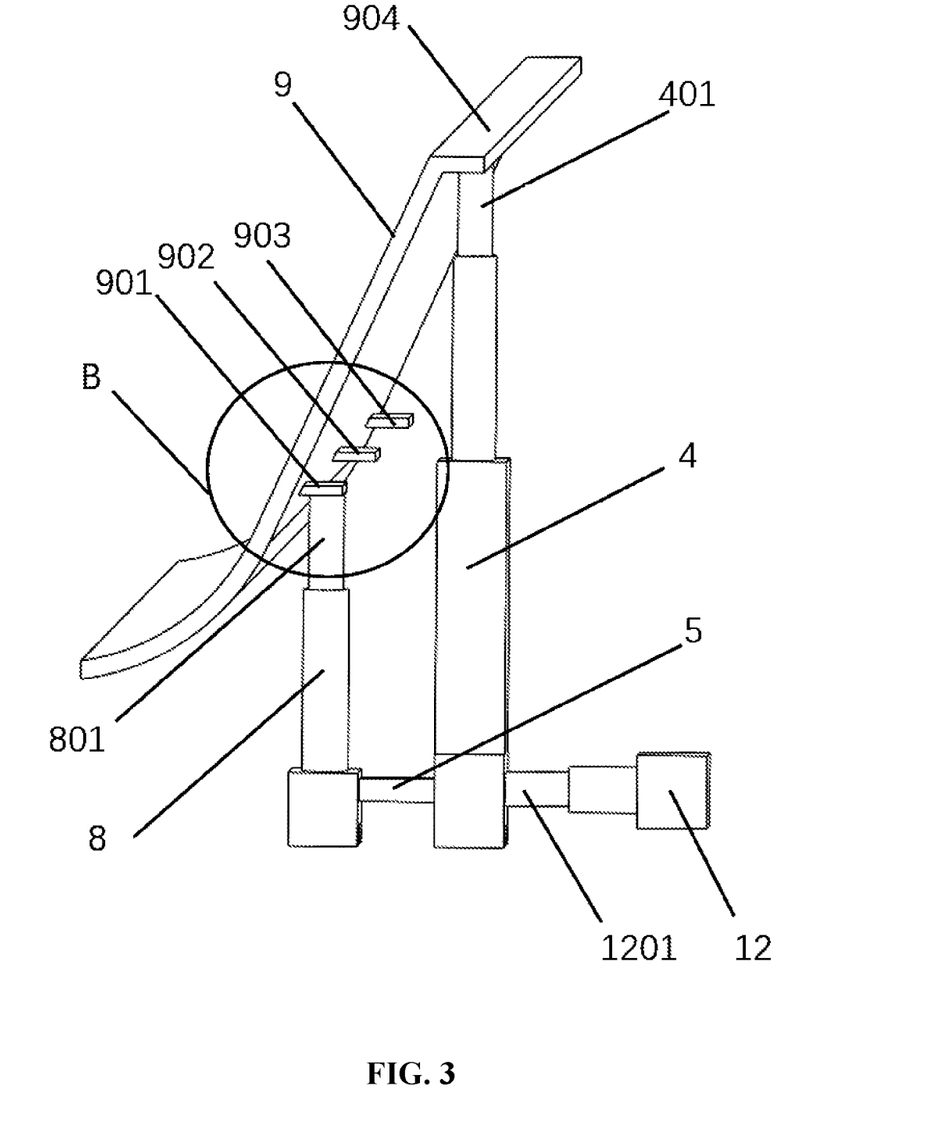
FIG. 3 is a local enlarged view of part B in FIG. 1.
Figure 5:
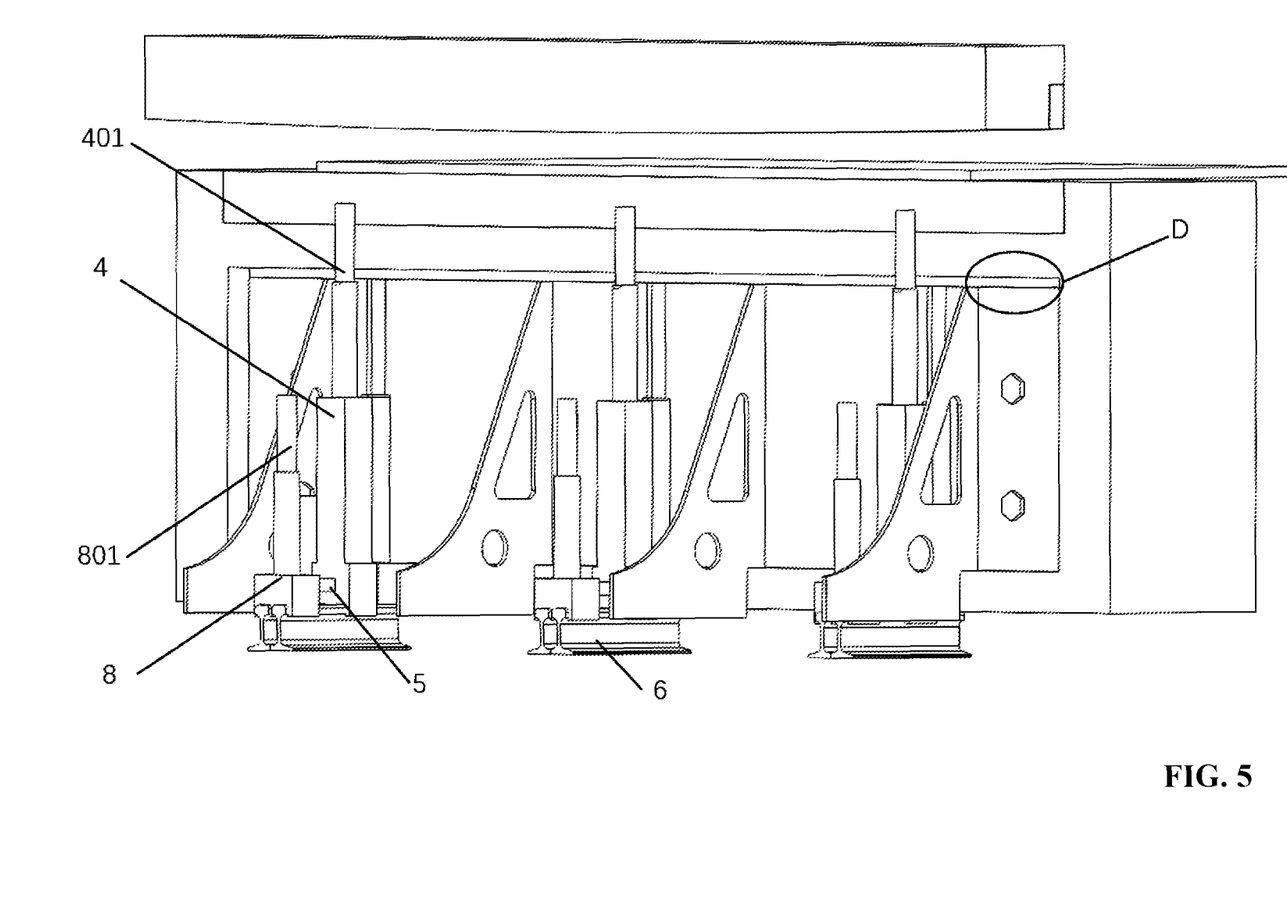
FIG. 5 is a schematic diagram of hydraulic support components according to one embodiment of the disclosure.

As shown in FIGS. 1, 3 and 5, the disclosure provides an auxiliary support device for a rolling-cut shear, comprising: an upper knife box 1, a steel plate 2, a lower cutting table 3, a plurality of first hydraulic support cylinders 4, a plurality of second hydraulic support cylinders 8, and a slide plate 9. Each of the plurality of first hydraulic support cylinders 4 comprises a first support rod 401; each of the plurality of second hydraulic support cylinders 8 comprises a second support rod 801). An upper shear blade 101 is disposed in the upper knife box 1. The bottom of the steel plate 2 is placed flat on the top of the lower cutting table 3. The front end of the lower cutting table 3 is equipped with a first mounting groove 304 for receiving a lower shear blade 301 of a rolling-cut shear. When the upper cutting box 1 is driven to move, the upper cutting edge 101 coordinates with the lower cutting edge 301 to achieve the function of cutting the plate. The plurality of first support rod 401 are connected to the bottom end of a fourth transverse plate 904 of the slide plate 9 at the top, and the tops of the plurality of second support rod 801 are respectively connected to the bottom ends of a first transverse plate 901, a second transverse plate 902, a third transverse plate 903, respectively. The plurality of first hydraulic support cylinders 4 synchronously control corresponding first support rods 401 to extend and retract; the plurality of second hydraulic support cylinders 8 synchronously control corresponding second support rods 801 to extend and retract, thus lifting and lowering of the slide plate 9, achieving the function of supporting the steel plate.

Figure 2:
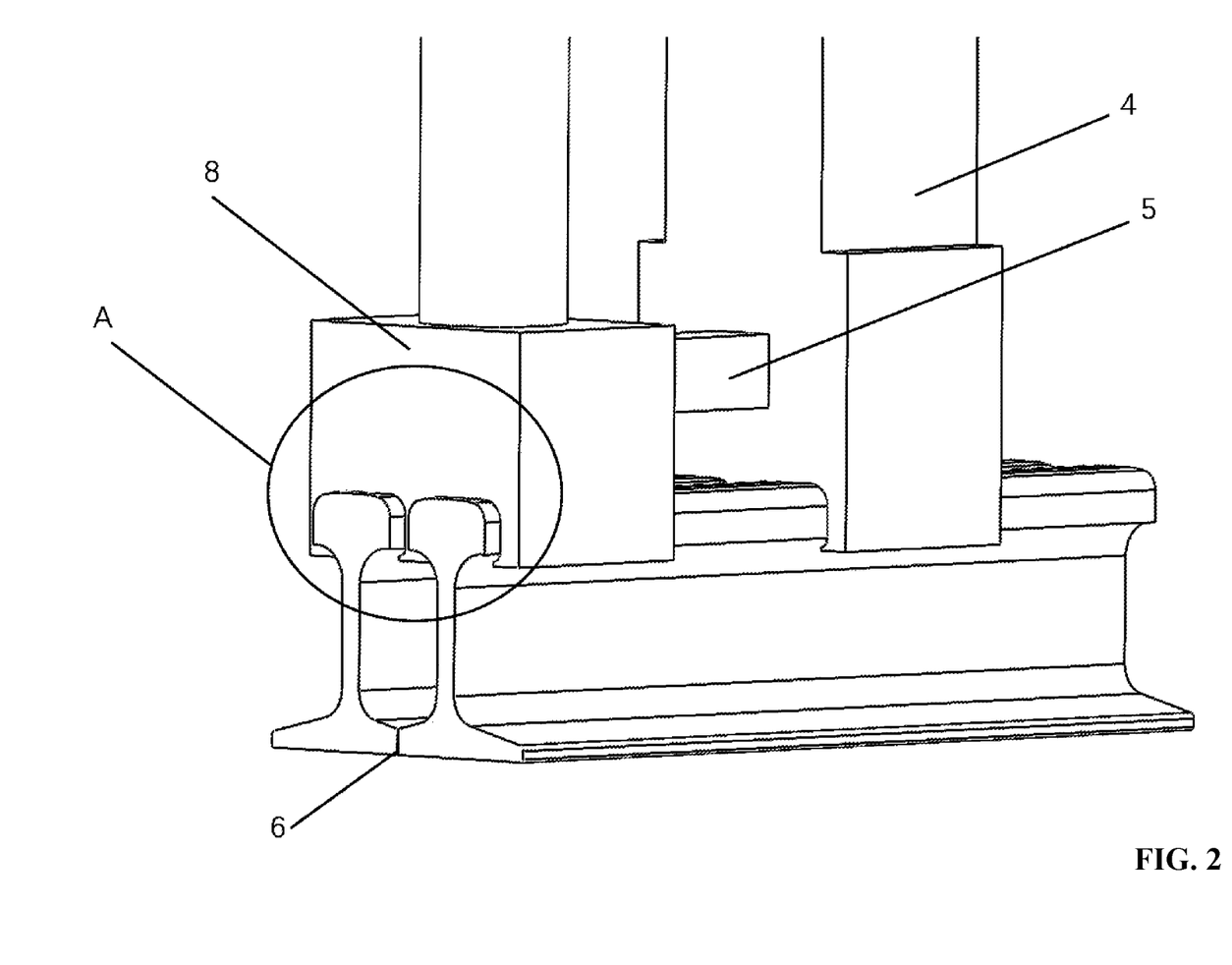
FIG. 2 is a local enlarged view of part A in FIG. 1.

As shown in FIGS. 2 and 3, a first bottom surface of each of the plurality of first hydraulic support cylinders 4 and each of the plurality of second hydraulic support cylinders 8 comprises a sliding groove configured to fit with a slide rail 6 fixed on ground of a workshop; a top surface of the slide rail 6 is flush with a second bottom surface of the lower cutting table 3; and a leading end of the slide rail 6 is oriented to the same direction as a leading end of the lower cutting table 3. A plurality of sliding rails can be disposed at intervals according to actual working conditions. A second front end of each of the plurality of first hydraulic support cylinders 4 is connected to a first rear end of each of the plurality of second hydraulic support cylinders 8 through a connection rod 5. Each of the plurality of horizontal hydraulic cylinders 12 comprises a third support rod 1201, and a second rear end of each of the plurality of first hydraulic support cylinders 4 is connected to a third front end of the third support rod 1201. The plurality of horizontal hydraulic cylinders 12 synchronously control corresponding third support rods 1201 to extend and retract, achieving the reciprocating movement of the hydraulic support components.

Figure 4:
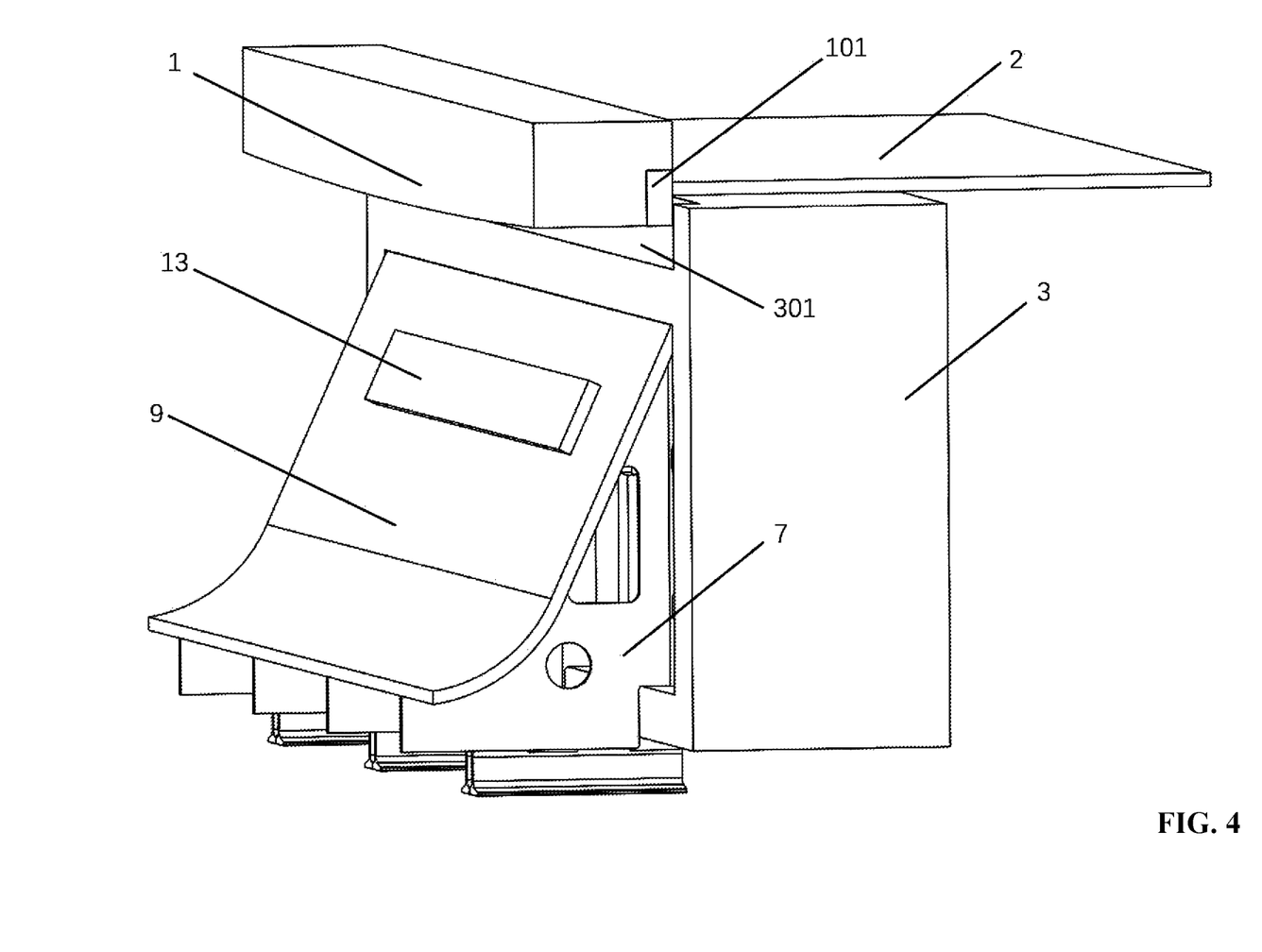
FIG. 4 is a schematic diagram of a slide plate embedded in a lower cutting table 3 according to one embodiment of the disclosure.
Figure 6:
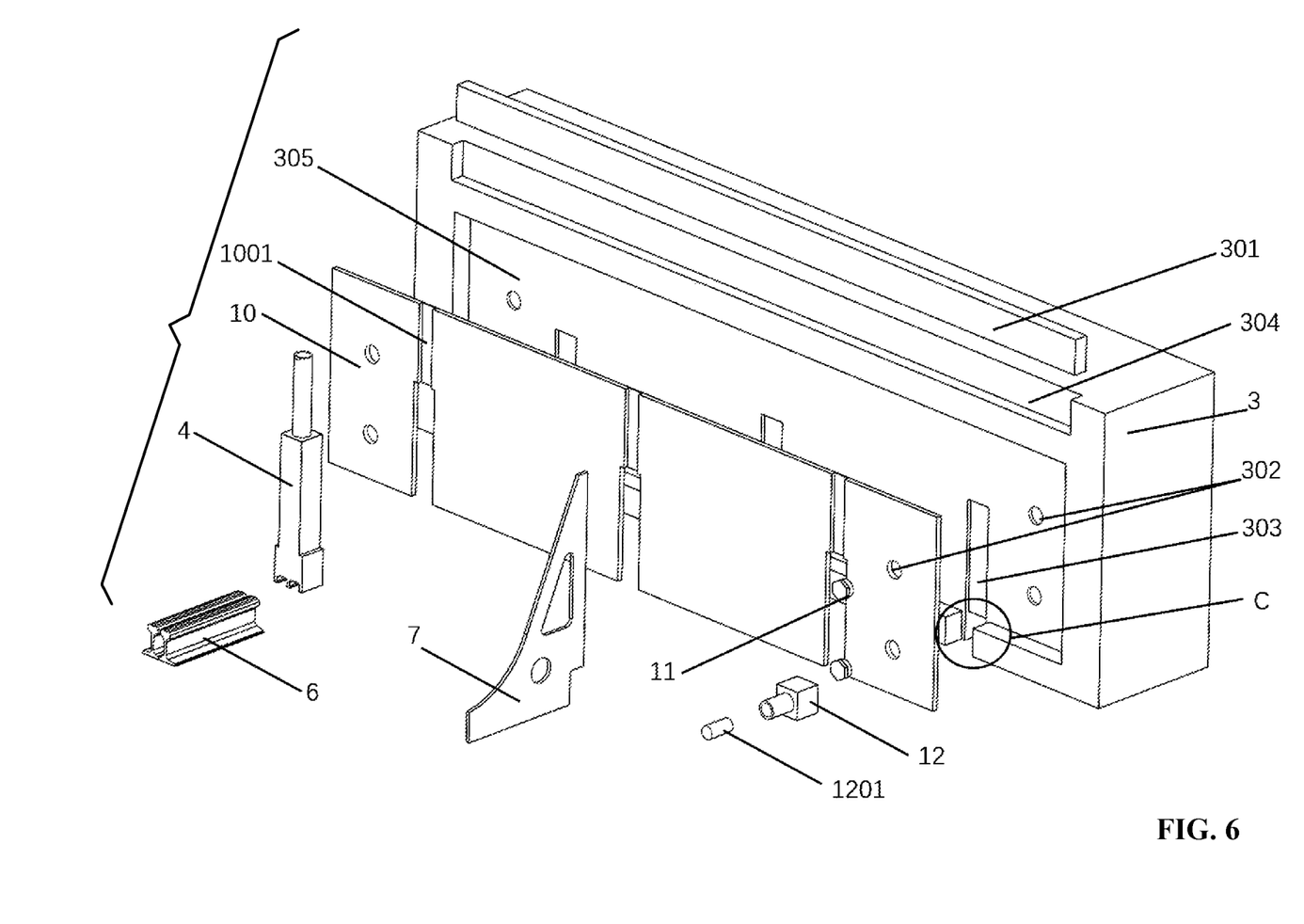
FIG. 6 is an exploded view of hydraulic support components according to one embodiment of the disclosure.

As shown in FIGS. 4, 5 and 6, the front end of the lower cutting table 3 is equipped with the first mounting groove 304 and a second mounting groove 305. The lower shear blade 301 is disposed in the first mounting groove 304. The bottom wall of the second mounting groove 305 comprises a plurality of first bolt holes 302 and a plurality of first recesses 303. The inner plate 10 is embedded in the second mounting groove 305 through a plurality of bolts 11 passing through the plurality of first bolt holes 302. The inner plate 10 is attached to the bottom wall of the second mounting groove 305, and a longitudinal width of the inner plate 10 is less than a longitudinal width of the second mounting groove 305, that is, 5 mm as shown part D in FIG. 5; a width difference between the inner plate 10 and the second mounting groove 305 is equal to a thickness of the fourth transverse plate 904 plus a mounting margin; the fourth transverse plate 904 is parallel to the lower cutting table 3 and is disposed in a gap between the inner plate 10 and the second mounting groove 305; and the depth of the second mounting groove 305 is equal to the width of the fourth transverse plate 904. After being installed, the inclined surface of the slide plate 9 is connected to the front end of the lower cutting table 3 in a natural transition mode. The cut waste material 13 stays at the top end of the fourth horizontal plate 904 of the slide plate 9. The slide plate 9 descends and retracts into the second mounting groove 305. The waste material 13 is pushed onto the inclined surface of the slide plate 9 by the lower cutting table 3, and freely slides to the waste collection area under gravity, or the waste material 13 is cut and dropped onto the inclined surface of the slide plate 9, and freely slides from the inclined surface to the waste collection area under gravity, achieving the transportation of waste material. The bottom ends of the plurality of support plates 7 are flush with the bottom end of the inner plate 10, and each of the bottom ends of the plurality of support plates 7 comprises a right-angle groove for fitting and approaching the plurality of support plates 7 to the second mounting groove 305 of the lower cutting table 3; top ends of the plurality of support plates 7 are flush with a top end of the inner plate 10, and the plurality of support plates 7 abut at intervals against an outer wall of the inner plate 10, thus facilitating the placement of slide plate 9 on the support plates 7, achieving the support for the slide plate 9 when the fourth transverse plate is embedded in the second mounting groove 305.

Figure 7:
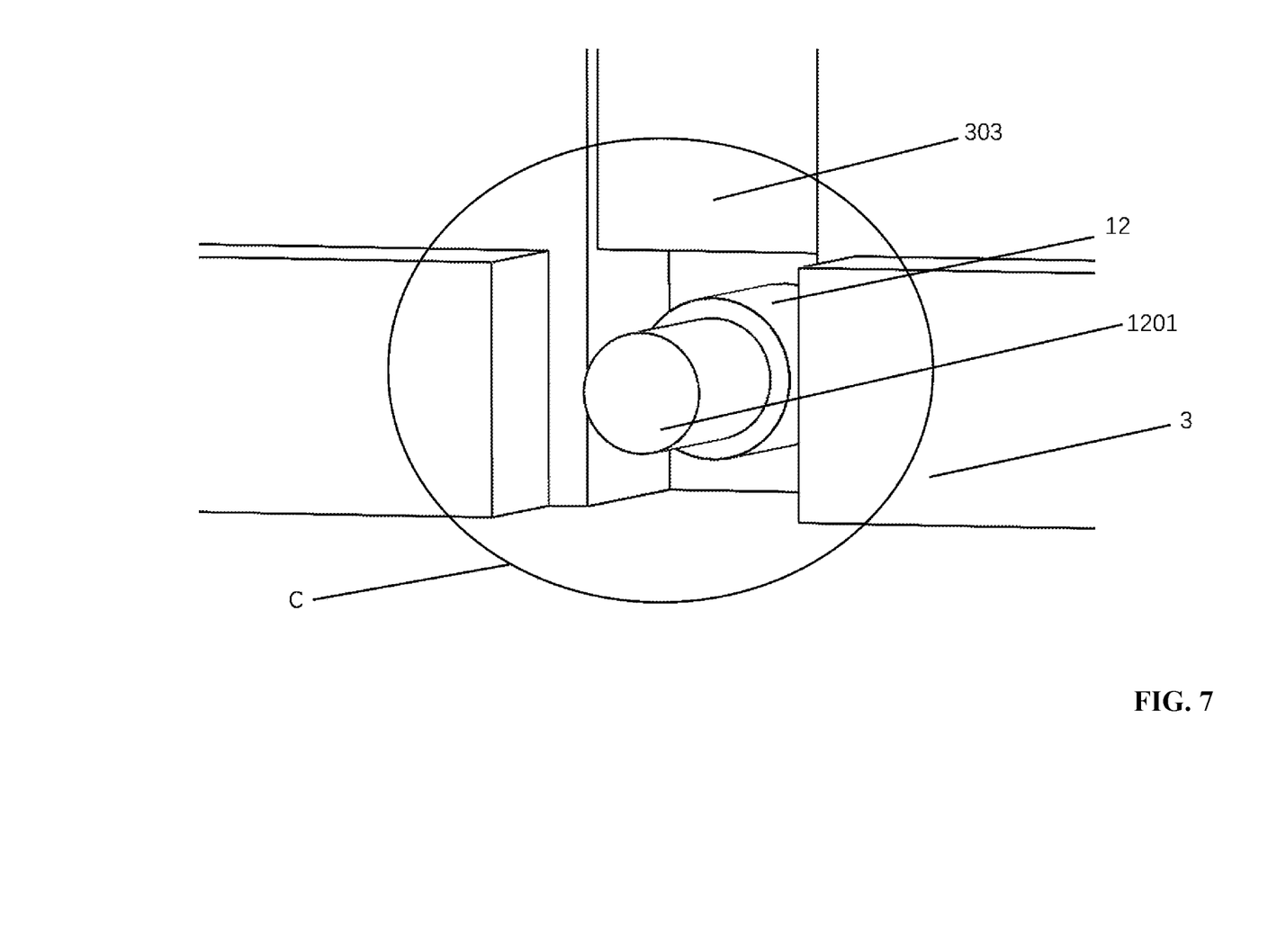
FIG. 7 is a local enlarged view of part C in FIG. 6.
Figure 8:
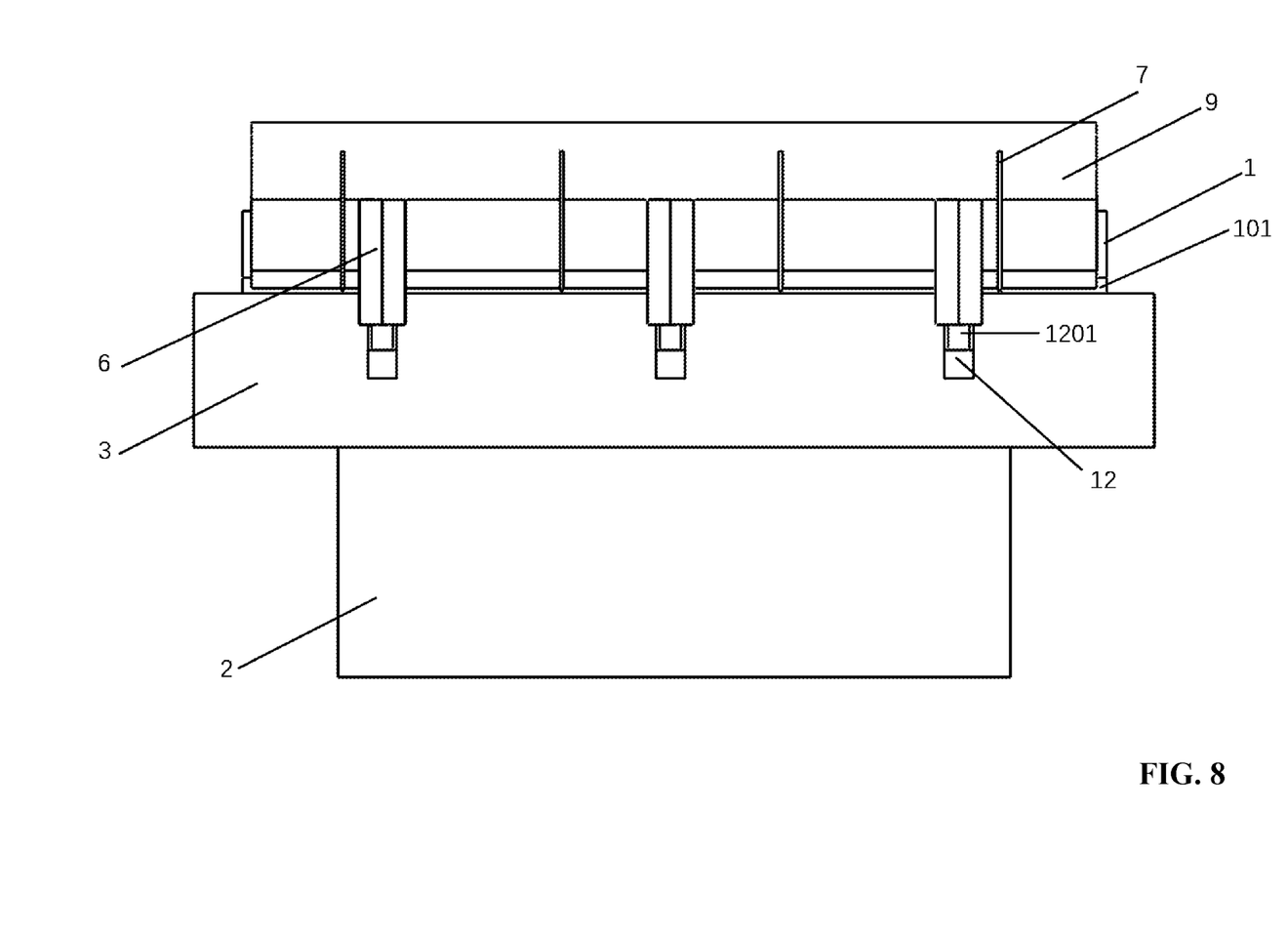
FIG. 8 is a top view of an auxiliary support device for a rolling-cut shear according to one embodiment of the disclosure.

As shown in FIGS. 6-8, the second rear ends of the plurality of first hydraulic support cylinders 4 are embedded in the plurality of second recesses 1001 and the plurality of first recesses 303; the plurality of second recesses 1001 and the plurality of first recesses 303 are in line with slide rails 6. The style and size of the second recesses 1001 are the same as that of the plurality of first hydraulic support cylinders 4. The style and size of the first recesses 303 are the same as that of the plurality of first hydraulic support cylinders. In the retracted state of the third support rods 1201 into the horizontal hydraulic cylinders 12, the fourth transverse plate 904 on the first support rods 401 of the first hydraulic support cylinders 4 is fully embedded in the second mounting groove 305. Two sides of the plurality of horizontal hydraulic cylinders 12 are disposed in the plurality of first recesses 303; a third bottom surface of each of the plurality of horizontal hydraulic cylinders 12 is flush with second bottom surface of the lower cutting table 3; and a third rear end of each of the plurality of horizontal hydraulic cylinders 12 is disposed in the plurality of first recesses 303. The horizontal hydraulic cylinders 12 controls the extension and retraction of the third support rods 1201, driving the first hydraulic support cylinders 4 to move on the slide rails 6. When the third support rods are extended, the first hydraulic support cylinders 4 are pushed out of the first recesses 303 and the second recesses 1001. When the third support rods are retracted, the first hydraulic support cylinders 4 are retracted back into the first recesses 303 and the second recesses 1001, achieving the storage of the hydraulic cylinder components.

Figure 9:
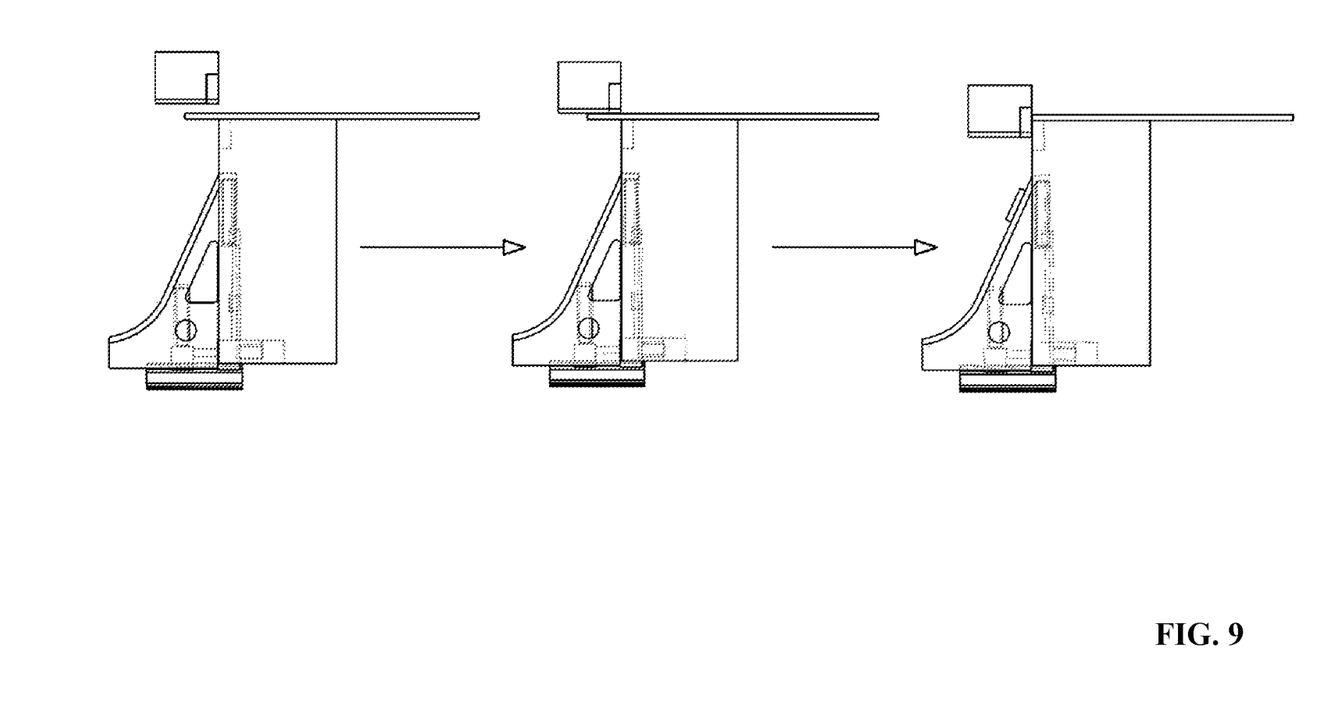
FIG. 9 is a work process of steel plate shearing when a slide plate is embedded in a lower cutting table according to one embodiment of the disclosure.
Figure 10:
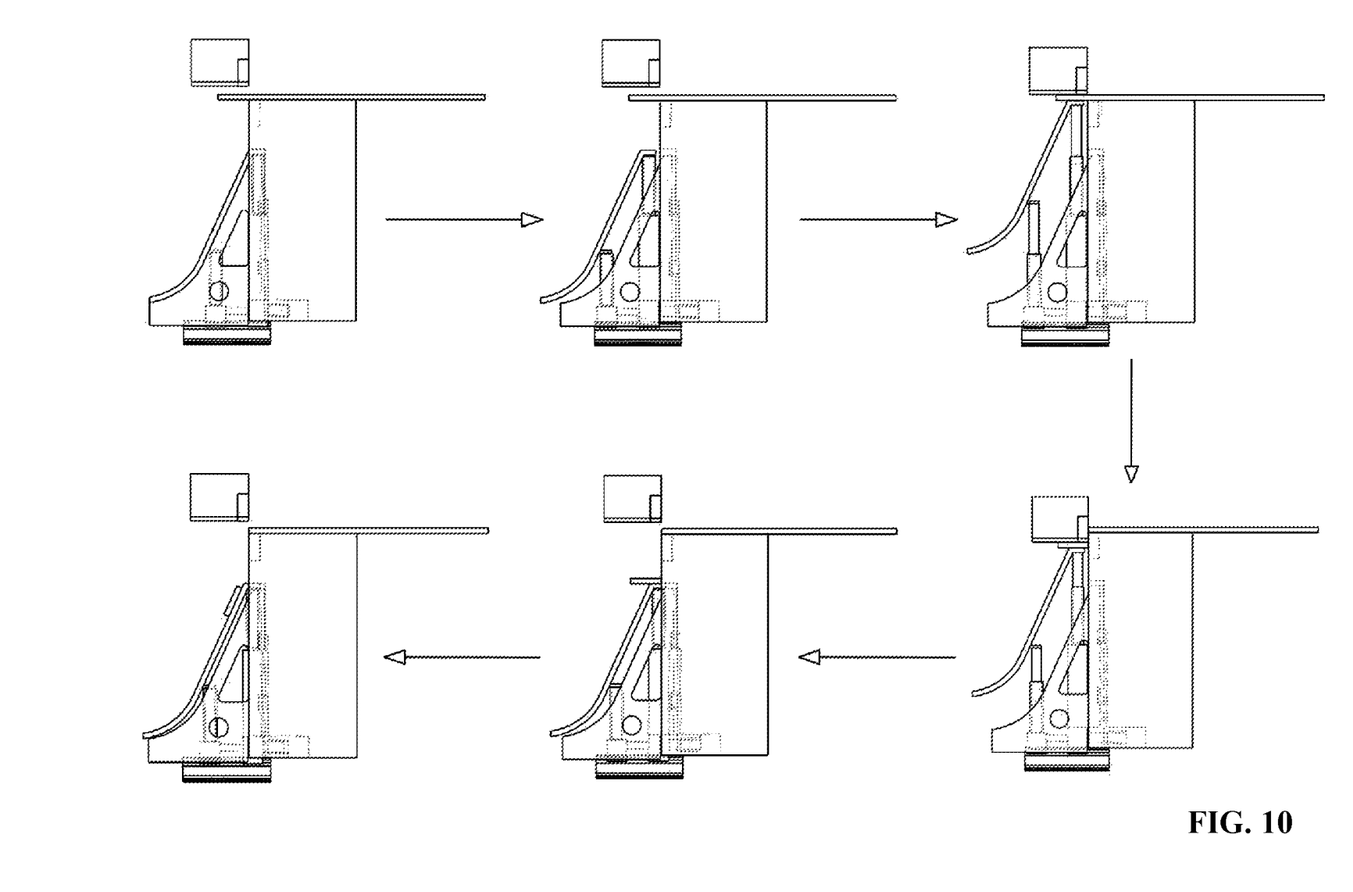
FIG. 10 is a work process of steel plate shearing when a slide plate extends out of a lower cutting table according to one embodiment of the disclosure.

The working process of the auxiliary support device for a rolling-cut shear is as follows:
  when the slide plate 9 is retracted in the second mounting groove 305, as shown in FIG. 9:
  Y1: moving a steel plate 2 to the upper plane of the lower cutting table 3 and setting a cutting size; driving an upper knife box 1 comprising an upper shear blade 101 to move to perform rolling cutting downwards; as the upper knife box falls, the upper shear blade 101 contacts and presses the steel plate 2; the upper shear blade 101 and the lower shear blade 301 cooperate to cut the steel plate 2, achieving the function of plate cutting;
  Y2: the slide plate 9 is embedded in the second mounting groove 305, and the waste material 13 produced after cutting falls onto the inclined surface of the slide plate 9 due to gravity, freely sliding to a waste collection point to achieve the waste transportation function of the slide plate; at this point, a workflow ends;
  when the slide plate 9 moves out of the second mounting groove 305, as shown in FIG. 10:
  S1: moving a steel plate 2 to the upper plane of the lower cutting table 3 and setting a cutting size; synchronously controlling, by the plurality of horizontal hydraulic cylinders 12, the corresponding third support rods 1201 to extend to the optimal support positions, that is, the fourth transverse plate 904 of the slide plate 9 moves fully out of the lower cutting table 3 and a gap between the fourth transverse plate 904 and the lower shear blade 301 corresponds to a thickness of the steel plate; synchronously driving the plurality of first hydraulic support cylinders 4 and the plurality of second hydraulic support cylinders 8 along slide rails 6 to move towards the front end of the lower cutting table 3, thus achieving the reciprocating movement of the hydraulic support cylinders; in this way, the first support rods 401 synchronously extend out of the plurality of first hydraulic support cylinders 4 in the same speed as that of the second support rods 801 synchronously extending out of the plurality of second hydraulic support cylinders 8; the slide plate 9 is lifted vertically, so that the top end face of the fourth transverse plate 904 is at the same height as the upper end face of the lower cutting table and in contact with the bottom of the steel plate 2, to support the steel plate;
  S2: driving an upper knife box 1 comprising an upper shear blade 101 to move to perform rolling cutting downwards; as the upper knife box falls, the upper shear blade 101 contacts and presses the steel plate 2; the plurality of first hydraulic support cylinders 4 provide upward hydraulic support force, allowing the first support rods 401 to support the bottom end of the fourth transverse plate 904, thereby supporting the bottom of the steel plate 2; the upward hydraulic support force is less than the downward shear force, and is offset by the part of the downward shear force of the upper knife box 1, achieving approximate "pure shear"; when falling, the upper knife box 1 will naturally press the first support rods 401 and the second support rods 801 into their respective hydraulic support cylinders; each of the hydraulic cylinders is equipped with a built-in magnetostrictive displacement sensor, which can provide real-time feedback on the position of the support rods; the upper shear blade 101 and the lower shear blade 301 work together to cut the head of the steel plate 2, achieving the function of plate shearing;
  S3: the head of the steel plate 2 that has been cut off is waste material 13; the waste material 13 is subjected to downward pressure from the upper shear blade 101 and upward support force from the fourth transverse plate 904 of the slide plate 9, causing the waste material 13 to be sandwiched between the upper shear blade 101 and the fourth transverse plate 904; as the upper shear blade 101 falls to its limit position, the upper knife box 1 lifts upwards, the waste material 13 stays on the top end face of the fourth transverse plate 904; at this point, the first support rods 401 retract into the plurality of first hydraulic support cylinders 4 at a first speed, and the second support rods 801 retract into the plurality of second hydraulic support cylinders 8 at a second speed which is the same as the first speed; the slide plate 9 vertically descends and is clamped into the gap between inner plate 10 and the second mounting groove 305;
  S4: the third support rods 1201 synchronously retract into the plurality of horizontal hydraulic cylinders 12, driving the plurality of first hydraulic support cylinders 4 and the plurality of second hydraulic support cylinders 8 to move towards the rear end of the lower cutting table 3 along the slide rails 6; the slide plate 9 gradually moves towards the second mounting groove 305, and the waste material 13 staying on the top of the fourth horizontal plate 904 moves towards the rear end of the lower cutting table 3 along with the slide plate 9, and touches the front end of the lower cutting table 3; the waste material 13 is squeezed down from the top of the fourth horizontal plate 904 and falls freely onto the inclined surface of the slide plate 9 under gravity, achieving the waste transportation; with the third support rods 1201 synchronously retracting into the hydraulic cylinder, the fourth horizontal plate 904 is driven to fully embed into the second mounting groove 305 of the inner plate, and the inclined surface of the slide plate 9 adheres to the inclined surfaces of the support plates 7; the bottom of the fourth horizontal plate 904 is attached to the top of the support plates 7, thus achieving a cycle of workflow.

It will be obvious to those skilled in the art that changes and modifications may be made, and therefore, the aim in the appended claims is to cover all such changes and modifications.

What is claimed is:

1. An auxiliary support device for a rolling-cut shear, comprising:
   a lower cutting table;
   a plurality of first hydraulic support cylinders;
   a plurality of support plates;
   a plurality of second hydraulic support cylinders shorter than the plurality of first hydraulic support cylinders;
   a slide plate; and
   a plurality of horizontal hydraulic cylinders;
wherein
   the lower cutting table comprises a first front end comprising a first mounting groove for receiving a lower shear blade of the rolling-cut shear, a second mounting groove, and an inner plate;
   a bottom wall of the second mounting groove comprises a plurality of first bolt holes and a plurality of first recesses;
   the inner plate is embedded in the second mounting groove through a plurality of bolts passing through the plurality of first bolt holes;
   the inner plate comprises a plurality of second bolt holes and a plurality of second recesses; and the plurality of support plates lean against the inner plate;
   the plurality of first hydraulic support cylinders and the plurality of horizontal hydraulic cylinders are disposed in the plurality of first recesses; each of the plurality of first hydraulic support cylinders comprises a first support rod; the slide plate comprises a first transverse plate, a second transverse plate, a third transverse plate, and a fourth transverse plate; a top end of the first support rod abuts against a bottom end of the fourth transverse plate; a second front end of each of the plurality of first hydraulic support cylinders is connected to a first rear end of each of the plurality of second hydraulic support cylinders through a connection rod; each of the plurality of second hydraulic support cylinders comprises a second support rod; and bottom ends of the first transverse plate, the second transverse plate, and the third transverse plate abut against top ends of second support rods, respectively; and
   each of the plurality of horizontal hydraulic cylinders comprises a third support rod, and a second rear end of each of the plurality of first hydraulic support cylinders is connected to a third front end of the third support rod.

2. The device of claim 1, wherein the plurality of first hydraulic support cylinders synchronously control corresponding first support rods to extend and retract; the plurality of second hydraulic support cylinders synchronously control corresponding second support rods to extend and retract; the first support rods and the second support rods synchronously extend and retract with a speed; the plurality of horizontal hydraulic cylinders synchronously control corresponding third support rods to extend and retract; all hydraulic support cylinders are a hydraulic servosystem, and each of the hydraulic support cylinders is equipped with a built-in magnetostrictive displacement sensor to provide real-time feedback on a position of a corresponding support rod.

3. The device of claim 2, wherein a first bottom surface of each of the plurality of first hydraulic support cylinders and each of the plurality of second hydraulic support cylinders comprises a sliding groove configured to fit with a slide rail fixed on ground of a workshop; a top surface of the slide rail is flush with a second bottom surface of the lower cutting table; and a leading end of the slide rail is oriented to the same direction as a leading end of the lower cutting table.

4. The device of claim 3, wherein second rear ends of the plurality of first hydraulic support cylinders are embedded in the plurality of second recesses and the plurality of first recesses; the plurality of second recesses and the plurality of first recesses are in line with slide rails; two sides of the plurality of horizontal hydraulic cylinders are disposed in the plurality of first recesses; a third bottom surface of each of the plurality of horizontal hydraulic cylinders is flush with second bottom surface of the lower cutting table; and a third rear end of each of the plurality of horizontal hydraulic cylinders is disposed in the plurality of first recesses.

5. The device of claim 1, wherein the inner plate is attached to the bottom wall of the second mounting groove, and a longitudinal width of the inner plate is less than a longitudinal width of the second mounting groove; a width difference between the inner plate and the second mounting groove is equal to a thickness of the fourth transverse plate plus a mounting margin; the fourth transverse plate is parallel to the lower cutting table and is disposed in a gap between the inner plate and the second mounting groove; and a depth of the second mounting groove is equal to a width of the fourth transverse plate.

6. The device of claim 1, wherein bottom ends of the plurality of support plates are flush with a bottom end of the inner plate, and each of the bottom ends of the plurality of support plates comprises a right-angle groove for fitting and approaching the plurality of support plates to the second mounting groove of the lower cutting table; top ends of the plurality of support plates are flush with a top end of the inner plate, and the plurality of support plates abut at intervals against an outer wall of the inner plate.

* * * * *